United States Patent
Ciolek et al.

(10) Patent No.: US 11,836,331 B2
(45) Date of Patent: *Dec. 5, 2023

(54) MATHEMATICAL MODELS OF GRAPHICAL USER INTERFACES

(71) Applicant: ASAPP, INC., New York, NY (US)

(72) Inventors: Daniel Alfredo Ciolek, Ciudad Autónoma de Buenos Aires (AR); Clemens Georg Benedict Rosenbaum, New York, NY (US); Adrian Philip Botta, New York, NY (US)

(73) Assignee: ASAPP, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,415

(22) Filed: Dec. 27, 2022

(65) Prior Publication Data

US 2023/0161947 A1 May 25, 2023

Related U.S. Application Data

(63) Continuation of application No. 16/866,179, filed on May 4, 2020, now Pat. No. 11,567,851.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0483* (2013.01); *G06F 3/04845* (2013.01);
(Continued)

(58) Field of Classification Search
CPC .......... G06F 40/14; G06F 40/166; G06N 3/08
See application file for complete search history.

(56) References Cited

U.S. PATENT DOCUMENTS 9,747,263 B1 * 8/2017 Dhruv ................. G06F 16/9535
9,858,171 B2    1/2018 Chu
(Continued)

OTHER PUBLICATIONS

Ali, Shahbaz, et al., "Model Learning: A Survey on Foundation, Tools and Applications", arXiv:1901.01910v1 [cs.FL], https://arxiv.org/pdf/1901.01910.pdf, Dec. 6, 2018, 43 pages.
(Continued)

*Primary Examiner* — Rashawn N Tillery
(74) *Attorney, Agent, or Firm* — GTC Law Group PC & Affiliates

(57) ABSTRACT

A graph model of a graphical user interface (GUI) may be generated by processing usage data of the GUI where the usage data comprises sequences of GUI pages and actions between GUI pages. The nodes of the graph model may be determined by obtaining GUI pages from the usage data, identifying dynamic GUI elements in the GUI pages, generating canonical GUI pages by modifying the GUI pages using the dynamic GUI elements, and creating graph nodes using the canonical GUI pages. The edges of the graph may be determined by processing actions from the GUI data that were performed by users to transition from one GUI page to another GUI page. The graph model of the GUI may be used for any appropriate application, such as determining statistics relating to the GUI or statistics relating to individual users of the GUI.

20 Claims, 10 Drawing Sheets

(51) Int. Cl.
G06F 11/34 (2006.01)
G06F 3/0483 (2013.01)
G06F 17/18 (2006.01)
G06F 3/04845 (2022.01)
G06N 3/08 (2023.01)
G06N 20/00 (2019.01)
G06F 18/20 (2023.01)
G06F 40/166 (2020.01)
G06F 40/14 (2020.01)

(52) U.S. Cl.
CPC .......... *G06F 11/3438* (2013.01); *G06F 17/18* (2013.01); *G06F 18/29* (2023.01); *G06F 40/14* (2020.01); *G06F 40/166* (2020.01); *G06N 3/08* (2013.01); *G06N 20/00* (2019.01)

(56) References Cited

U.S. PATENT DOCUMENTS

| | | | |
|---|---|---|---|
| 10,148,608 | B2 | 12/2018 | Chatterjee et al. |
| 11,113,600 | B2 | 9/2021 | Wagstaff |
| 11,567,851 | B2 | 1/2023 | Ciolek et al. |
| 2010/0306158 | A1 | 12/2010 | Andersen et al. |
| 2011/0145653 | A1 | 6/2011 | Broadfoot et al. |
| 2012/0016897 | A1* | 1/2012 | Tulumbas ............ G06F 16/9566 707/E17.069 |
| 2014/0143231 | A1* | 5/2014 | Adari ................... G06F 16/957 707/769 |
| 2014/0344663 | A1* | 11/2014 | Joel ........................ H04L 67/02 715/234 |
| 2015/0310195 | A1* | 10/2015 | Bailor ..................... G06F 21/45 726/6 |
| 2016/0148119 | A1 | 5/2016 | Hsu |
| 2016/0188143 | A1 | 6/2016 | Kohlmeier et al. |
| 2018/0121546 | A1 | 5/2018 | Dingwall et al. |
| 2018/0253669 | A1* | 9/2018 | Thunoli ............... G06Q 10/067 |
| 2018/0314676 | A1* | 11/2018 | Lal ....................... G06F 40/103 |
| 2018/0330248 | A1 | 11/2018 | Burhanuddin et al. |
| 2019/0121518 | A1* | 4/2019 | Anima ................ G06F 3/04842 |
| 2019/0196932 | A1 | 6/2019 | Adika et al. |
| 2019/0347315 | A1* | 11/2019 | Hardee ............... G06F 16/9577 |
| 2020/0034357 | A1 | 1/2020 | Panuganty et al. |
| 2020/0097879 | A1* | 3/2020 | Venkata ................. G06N 20/00 |
| 2020/0257511 | A1* | 8/2020 | Durvasula ................ G06F 8/36 |
| 2021/0133622 | A1* | 5/2021 | Nidd ....................... G06N 5/027 |
| 2021/0271494 | A1* | 9/2021 | Rosenbaum ............ G06F 9/451 |
| 2021/0342247 | A1 | 11/2021 | Ciolek et al. |
| 2022/0092136 | A1* | 3/2022 | Pampana ............ G06F 11/3688 |

OTHER PUBLICATIONS

Chang Chia-Hui, et al., "A Survey of Web Information Extraction Systems", IEEE Transactions on Knowledge and Data Engineering, vol. 18, No. 10, https://ieeexplore.ieee.org/document/1683775, Oct. 2006, pp. 1411-1428.

Degris, Thomas, et al., "Learning the Structure of Factored Markov Decision Processes in Reinforcement Learning Problems", ICML '06: Proceedings of the 23rd International Conference on Machine Learning, https://doi.org/10.1145/1143844.1143877, Jun. 2006, pp. 257-264.

Günther, Christian W, et al., "Fuzzy Mining—Adaptive Process Simplification Based on Multi-Perspective Metrics", International Conference on Business Process Management (BPM 2007), part of the Lecture Notes in Computer Science book series (LNISA), vol. 4714, https://link.springer.com/chapter/10.1007/978-3-540-75183-0_24, 2007, pp. 328-343.

Ha, David, "Recurrent World Models Facilitate Policy Evolution", arXiv:1809.01999v1 [cs.LG], https://arxiv.org/pdf/1809.01999.pdf, Sep. 4, 2018, 15 pages.

Ha, David, et al., "World Models", arXiv:1803.10122v4 [cs.LG], https://arxiv.org/pdf/1803.10122.pdf, May 9, 2018, 21 pages.

Kaiser, Łukasz, et al., "Model Based Reinforcement Learning for Atari", Published as a conference paper at ICLR 2020, arXiv:1903.00374v4 [cs.LG], https://arxiv.org/pdf/1903.00374.pdf, Feb. 19, 2020, 28 pages.

Kipf, Thomas N., et al., "Semi-Supervised Classification with Graph Convolutional Networks", arXiv:1609.02907v4 [cs.LG], https://arxiv.org/pdf/1609.02907.pdf (accessed on Apr. 8, 2020), Feb. 22, 2017, 14 pages.

Macropol, Kathy, "Clustering on Graphs: The Markov Cluster Algorithm (Mcl)", CS 595D Presentation, https://sites.cs.ucsb.edu/~xyan/classes/CS595D-2009winter/MCL_Presentation2.pdf, Winter 2009, 46 pages.

Newman, M.E.J., "Modularity and community structure in networks", Proceedings of the National Academy of Sciences, vol. 103, No. 23, https://www.pnas.org/doi/epdf/10.1073/pnas.0601602103, Jun. 6, 2006, pp. 8577-8582.

Schmidhuber, Jürgen, "A Possibility for Implementing Curiosity and Boredom in Model-Building Neural Controllers", Proceedings of the First International Conference on Simulation of Adaptive Behavior on From Animals to Animats, editors: J. A. Meyer and S. W. Wilson, MIT Press/Bradford Books, https://people.idsia.ch/~juergen/curiositysab/node1.html, 1991, pp. 222-227 (15 pages).

Schmidhuber, Jürgen, "Curious Model-Building Control Systems", Proceedings of the International Joint Conference on Neural Networks, Singapore, vol. 2, IEEE, 1991, pp. 1458-1463.

Schrittwieser, Julian, et al., "Mastering Atari, Go, Chess and Shogi by Planning with a Learned Model", arXiv:1911.08265v2 [cs.LG], https://arxiv.org/pdf/1911.08265.pdf, Feb. 21, 2020, 21 pages.

* cited by examiner

Company Website https://www.example.com/confirmed

Address Updated

John Smith's address has been updated to:

Street: 100 Main Street
City: Springfield
State: New York
Zip: 12345

Fig. 2B

Company Website https://www.example.com/customer

Update Address

Enter new address for John Smith

Street: _____
City: _____
State: [ Alabama ▼ ]
Zip: _____

[ Submit ]

Fig. 2A

```
<html>
    <head>
    ...
    </head>
    <body class="content">Body Text
    ...
        <form class="address-form">Email Address Form
            <label class="control-label">Name:</label>
            <input name="name" type="text" value="John Doe">
            <label class="control-label">Email address:</label>
            <input name="email" type="email" value="user@example.com">
        </form>
    ...
    </body>
</html>
```

Fig. 7

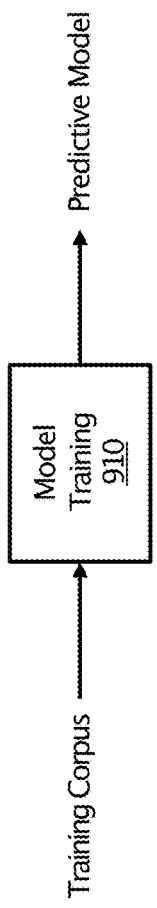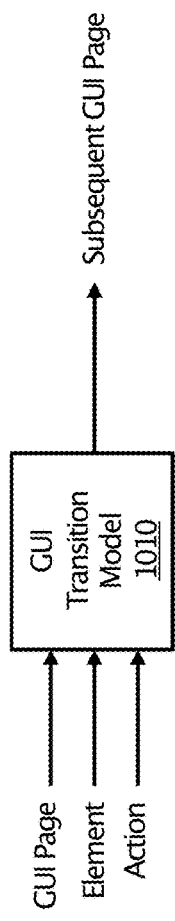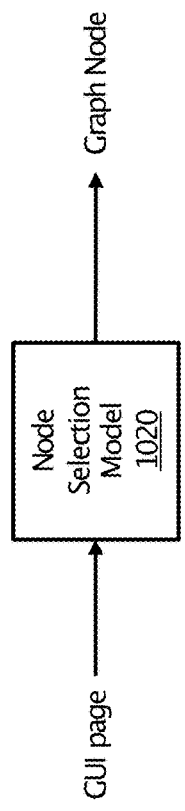

MATHEMATICAL MODELS OF GRAPHICAL USER INTERFACES

CROSS-REFERENCE TO RELATED APPLICATION

This application is a continuation and claims priority to U.S. patent application Ser. No. 16/866,179, filed May 4, 2020, which issued as U.S. Pat. No. 11,567,851 on Jan. 31, 2023, and entitled "Mathematical Models of Graphical User Interfaces". The foregoing application is incorporated herein by reference in its entirety for all purposes.

BACKGROUND

A graphical user interface allows users to navigate to different pages or screens for a variety of purposes. For example, an e-commerce website may allow users to navigate to different pages describing products that are available for sale to allow the users to learn more about the products and decide whether to purchase them. The e-commerce website may also provide pages that allow users to add products to a digital shopping cart and complete a purchase by paying for the products.

Graphical user interfaces may be large in that they may present a large number of different types of pages or similar pages with different types of information presented in them (e.g., a customer profile page for a first customer and a second customer). Accordingly, it may be challenging to process usage information of graphical user interfaces to determine useful information relating to the performance of the graphical user interfaces or users of the graphical user interfaces (e.g., customer service agents working on behalf of a company).

BRIEF DESCRIPTION OF THE FIGURES

The invention and the following detailed description of certain embodiments thereof may be understood by reference to the following figures:

FIGS. 2A and 2B illustrate example web pages of a simple website that allows a person to change a customer's address.

FIG. 7 is a portion of an example web page.

FIG. 9 is an example system for training a predictive model for a GUI using a corpus of training data.

FIG. 10A is an example system for implementing a predictive model for predicting a subsequent GUI page.

FIG. 10B is an example system for implementing a predictive model for predicting a best matching graph node for a GUI page.

DETAILED DESCRIPTION

Figure 1B:
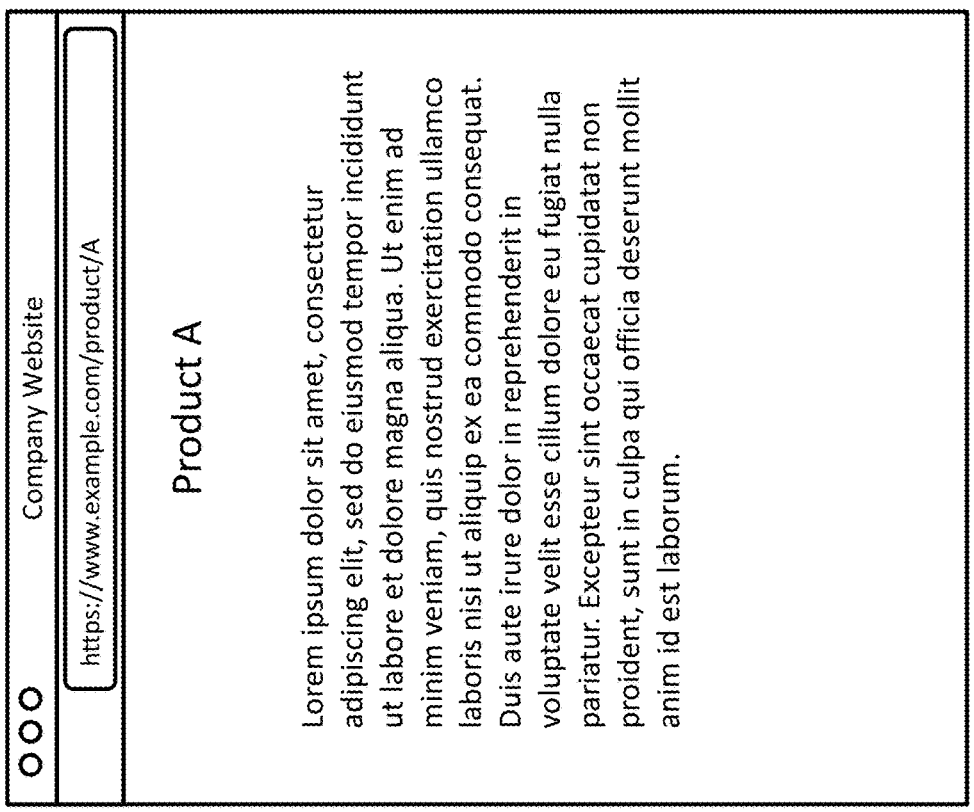
FIGS. 1A and 1B illustrate example web pages of a simple e-commerce website.

Graphical user interfaces (GUIs) are used in a wide variety of applications to present information to a user, and GUIs may be presented on a wide variety of devices, including but not limited to computer screens, tablets, smartphones, smart watches, and smart appliances. A device that presents a GUI may receive information or instructions for how to present or render that GUI on a display. For example, a device that presents a web page may receive the instructions in one or more files, such as HTML (hypertext markup language) files, CSS (cascading stylesheets) files, or JavaScript files. For another example, an Android device may receive the instructions in one or more files, such as XML (extensible markup language) files. Other devices may receive information for presenting the GUI in another format, and the techniques described herein are not limited to any particular manner of instructing a device to present a GUI. The techniques described herein will use a website and web pages as examples of a GUI, but the techniques described herein are not limited to websites and web pages and may be used with any appropriate GUI, such as a GUI presented by a mobile device (e.g., an Android phone or iPhone).

The techniques described herein relate to creating a mathematical model of a GUI that may be used for a variety of applications relating to a GUI. For example, a mathematical model of a GUI may be used to determine information about typical sequences of pages (that may be referred to as paths) that users traverse when navigating the GUI, actions in the GUI that are frequent or time consuming, or the performance of users who are using the GUI (e.g., customer service agents working on behalf of a company).

In some implementations, a mathematical model of a GUI may include a graph model (such as a directed graph model) with nodes and edges. For example, a node of the graph may correspond to one or more pages of the GUI and an edge of the graph may indicate an action that may be performed to navigate from one page of the GUI to another page of the GUI.

In some implementations, a mathematical model of a GUI may process a representation of a GUI page (e.g., a GUI page encoding) to determine other information relating to a GUI, such as a likely next page or a likely action to be performed on the page.

The techniques described herein may use any of the techniques described in U.S. patent application Ser. No. 16/805,927, which is incorporated herein by reference.

The techniques described herein relate to processing GUI pages (e.g., web pages) and GUI elements (e.g., HTML elements) of GUI pages. For clarity of presentation, terminology of web pages and HTML elements are now described as an example implementation of GUI pages.

A web page may include an HTML file and optionally other files (e.g., CSS and JavaScript files). An HTML file is made up of HTML elements in a tree structure. The top or root of the tree structure may be the <html> element. The <html> element may have child elements, such as a <head> element and a <body> element. The <head> and <body> elements may each have multiple child elements and so forth.

An HTML element has a "tag" that indicates the type of HTML element. Examples of tags include html, head, body, div, form, and so forth. Some HTML elements may have an opening tag and a closing tag with other content (such as text or other HTML elements) between them. Some HTML elements may consist of a single tag, such as the <img> element for an image.

An HTML element may have one or more attributes where each attribute may be a name or a name/value pair. For example, the following HTML element
<label class="control-label">Name:</label>
has one attribute where the name of the attribute is "class" and the value of the attribute is "control-label". An HTML element may have more than one attribute.

An element may include text and/or one or more child elements between the opening tag and the closing tag. In this situation, the text generally corresponds to the element, while the child elements are separate elements even though they are represented within their parent element. For example, for the element
<p>Hello <span>World!</span><p>
The text "Hello" is part of the paragraph element while the span element and its contents correspond to a child element.

In some implementations, a DOM (document object model) representation of a GUI page may be used in addition to or instead of HTML. A DOM representation of a web page may include modifications that are not present in an HTML file received at a device. For example, with a single-page web app, JavaScript may modify the DOM without receiving HTML corresponding to those changes. Where HTML is used in examples described herein, it is understood that a DOM representation may be used in addition to or instead of the HTML representation.

For other kinds of GUI pages, the GUI pages may have similarities with the HTML pages described above but may also have differences. For example, GUI pages may be presented using XML, which may include additional features, such as one or namespaces that are associated with elements or attributes.

Graph Models of Graphical User Interfaces

Before describing how to generate a graph model of a GUI, two relatively simple GUIs will be presented along with example graph models that could be generated from those GUIs.

Figure 1A:
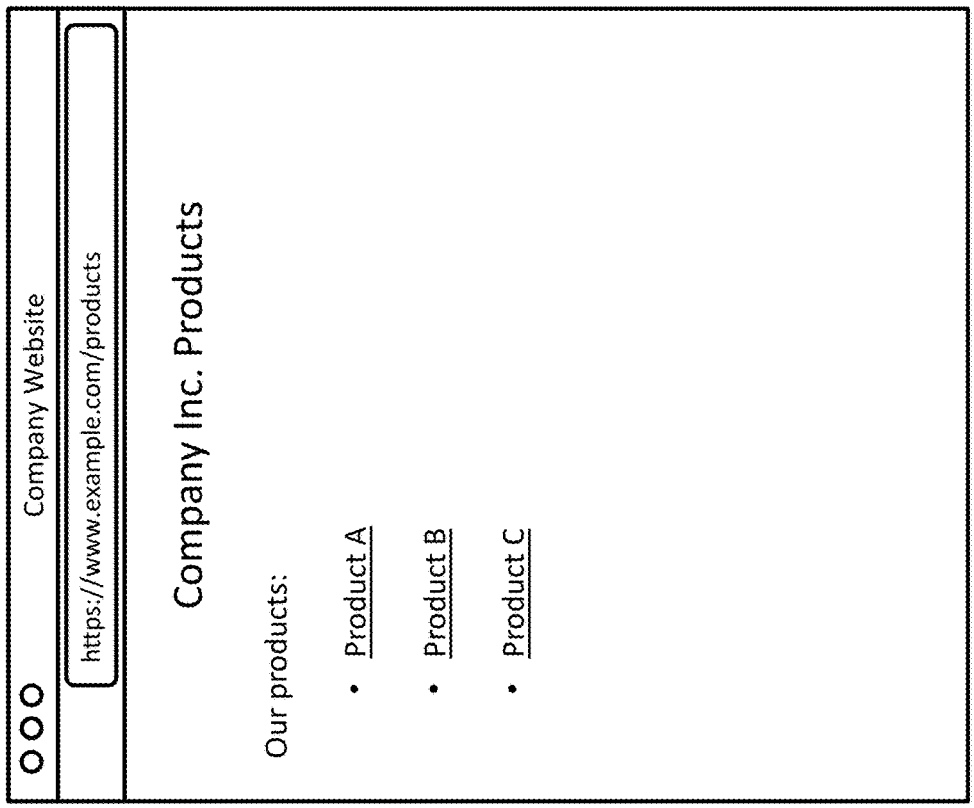

FIGS. 1A and 1B illustrate example web pages of a simple e-commerce website. The website may have a home page (not shown) that provides information about the company, and the home page may have a link to a product page, such as the product page shown in FIG. 1A. The product page may have a link back to the home page and may have links to specific products, such as the three links shown in FIG. 1A. Selecting a link for a product may cause the website to present a page for that product, such as the page for Product A shown in FIG. 1B.

Figure 3:
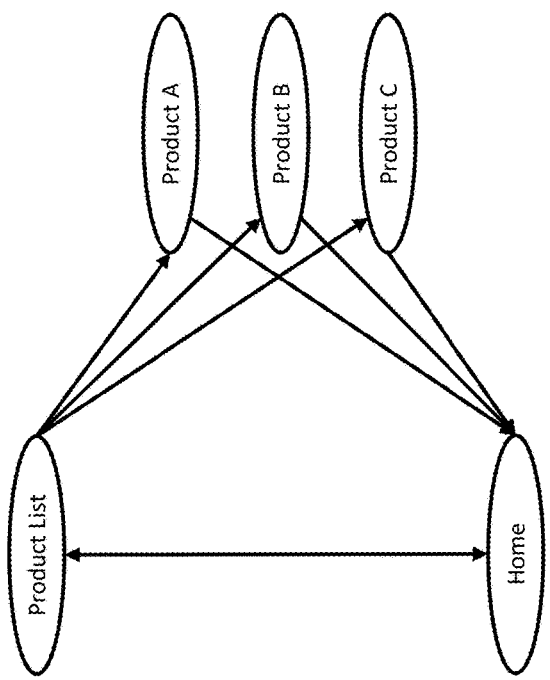

FIG. 3 illustrates an example graph that may be used to model transitions between the pages of the website of FIGS. 1A and 1B. The graph of FIG. 3 includes a node for the home page, a node for the product list page, and a node for each of the three products. The edges in the graph indicate the allowed transitions between pages. The edges may be directed edges as indicated by the arrows to indicate the direction of the allowed transitions. For example, from the home page, a user may transition only to the product list page. From the product list page, a user may transition to the home page or any of the three product pages. From the product pages, the user may only transition to the home page.

FIGS. 2A and 2B illustrate example web pages of a simple website that allows a person to change a customer's address. The website may have a customer update page that allows a user to enter a new address for a customer, such as the page shown in FIG. 2A. The customer update page may have form fields that may be used to enter information, such as text boxes and select boxes. When the user has completed updating the address, the user may click the submit button. After the user clicks the submit button, the website may show a confirmation page, such as the page shown in FIG. 2B.

Figure 4:
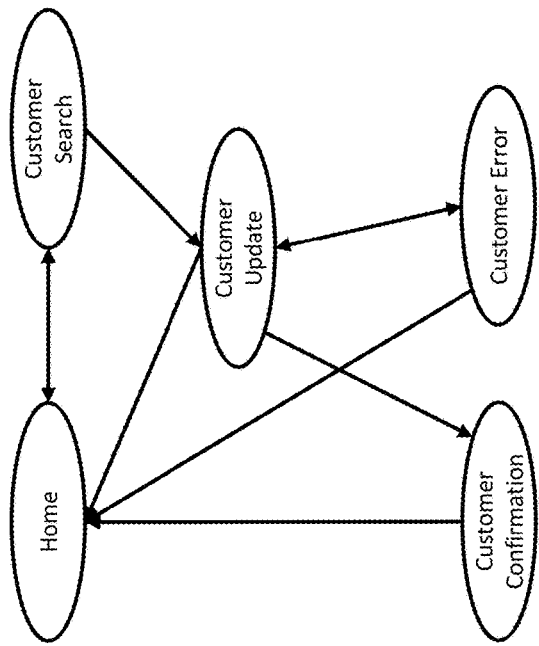
FIGS. 3 and 4 illustrate example graphs that may be used to model transitions between GUI pages.

FIG. 4 illustrates an example graph that may be used to model transitions between the pages of the website of FIGS. 2A and 2B. The graph of FIG. 4 includes nodes for pages in addition to the pages shown in FIGS. 2A and 2B. The graph has a node for a home page; a node for a customer search page that may allow a user to search for a particular customer (e.g., search by name); a node for the customer update page of FIG. 2A; a node for the customer confirmation page of FIG. 2B; and a node for a customer error page, such as when invalid information is entered into the customer update page (e.g., an invalid zip code). As above, the edges in the graph indicate the allowed transitions between pages.

While the above websites and graphs are relatively simple, other GUIs may have a large number of pages such that manual construction of a graph may not be feasible. To construct a graph for a GUI, usage data may be collected from the GUI, and the usage data may be used to construct a graph model as described herein. Any appropriate usage data may be collected, such as usage data from people using the GUI or usage data collected from automated traversal of the GUI.

Figure 5:
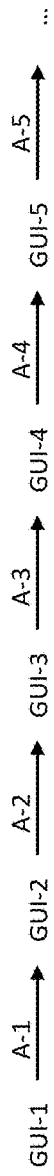
FIG. 5 illustrates an example sequence of GUI pages.

The usage data for training a mathematical model of a GUI may include sequences of GUI pages and the actions taken to transition from one GUI page to a subsequent GUI page. FIG. 5 illustrates an example sequence of GUI pages where GUI-1 through GUI-5 indicate GUI pages and A-1 through A-5 indicate actions performed (e.g., clicking on a particular GUI element with a mouse) to transition from one GUI page to the next GUI page. A sequence of GUI pages may be referred to as a trace. For example, referring to the graph of FIG. 3 and the web pages of FIGS. 1A and 1B, a sequence may start at the home page of a website, the user may perform an action of clicking on a first link, the GUI may return the product list page, the user may perform an action of clicking on a second link, and the GUI may return the product page for Product A.

When processing usage data of a GUI, different approaches are possible for representing usage data as a sequence of pages. In some implementations for websites, a GUI page may be the contents returned by the web server after each HTTP request (GET, POST, etc.) and an action may include all operations performed by a user between subsequent HTTP requests. Such implementations may be more appropriate for websites that include no client-side processing (e.g., JavaScript) or a relatively small amount of client-side processing.

In some implementations for websites, a new GUI page may result from actions of a user that do not cause HTTP requests. For example, each time an HTML element receives or loses focus, a new GUI page may be generated. For example, in FIG. 2A, after a user enters a street address in the form field and then clicks on the form field to enter the city, the street form field loses the focus, and the city form field receives the focus. Accordingly, a new GUI page may be generated that includes the entered street address in the form field. For another example, each time a user presses a key on a keyboard, a new GUI page may be generated.

Different criteria for generating GUI pages may have different levels of granularity. For example, generating GUI pages only on HTTP requests may have a lower level of granularity because it may generate a smaller number of GUI pages. Generating GUI pages on additional events (e.g., change in focus or a key press) may have a higher level of granularity because it may generate a larger number of GUI pages.

The techniques described herein may be used with any appropriate granularity of generating a sequence of GUI pages from usage data of a GUI.

When constructing a graph for a GUI, each node of the graph may correspond to one or more GUI pages that were presented by the GUI. A node may correspond to more than one GUI page because it may be desired to cluster or group similar pages together. The cluster or group of GUI pages may be represented by a canonical GUI page as described in greater detail below.

For example, consider the address updated page of FIG. 2B. A page similar to this one may be presented each time an address is successfully updated and these will be referred to collectively as address updated pages. On the address updated pages, some text and content may be the same on all pages, such as a header, footer, the page title ("Address Updated"), and some other text of the pages ("address has been updated to"). Other text and content of the address updated pages may be different, such as the name of the customer and the details of the updated address.

For the address update confirmation pages, a separate node could be added to the graph for each address update confirmation page, or a single node could be added to the graph to represent all of them. The decision may be determined by a person in charge of creating the graph model or could be determined by processing the usage data with a set of parameters (e.g., similarity thresholds or a maximum number of nodes). Any appropriate factors may be used to decide how to assign GUI pages to nodes, such as the size of the GUI (e.g., number of total pages) and available computing resources to generate and use the graph model.

Example techniques for generating a mathematical model for a GUI that includes a graph model are now described.

Figure 6:
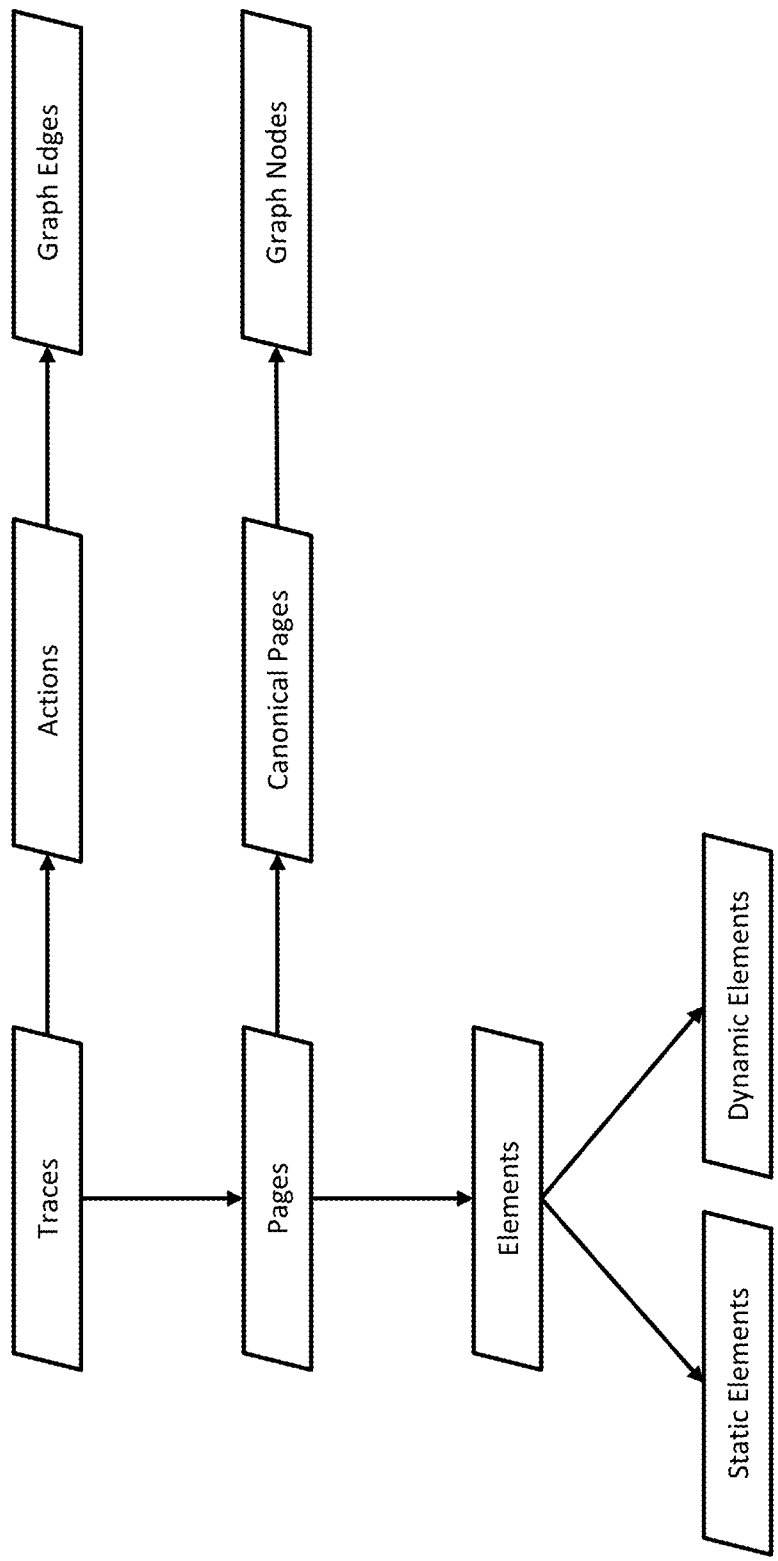
FIG. 6 is a conceptual presentation of how usage data may be processed to determine the nodes and edges of the graph model.

A graph model may be generated by processing a corpus of usage data (either from people using the GUI or from automated navigation of a GUI). The usage data may include traces as described above. The traces of the usage data may be processed to determine the nodes of the graph and also the edges of the graph. FIG. 6 is a conceptual presentation of how the traces of the usage data may be processed to determine the nodes and edges of the graph. Each trapezoid of FIG. 6 indicates a collection of the corresponding data. For example, the "traces" trapezoid indicates the traces in the usage data, and the "pages" trapezoid indicates the GUI pages in the usage data.

The process of assigning GUI pages to nodes may include clustering or grouping similar GUI pages together, and the group may be represented by a canonical GUI page. For example, a canonical GUI page may include GUI elements that are common to most or all of the GUI pages in a group and may discard GUI elements that vary among the GUI pages in the group. For another example, information that varies among GUI pages in a group may be represented in the canonical GUI page using a special token or a wildcard character. In some implementations, a canonical GUI page may also discard information that is present on all GUI pages or many different types of GUI pages (e.g., a web page footer) since that information may not be valuable in distinguishing different types or groups of GUI pages.

In some implementations, a canonical GUI page may be created from each GUI page, and GUI pages that have identical canonical GUI pages may be grouped together and represented by the canonical GUI page. A node may then be added to the graph for all pages represented by the canonical GUI page, and the node may be associated with the canonical GUI page.

Now described are example techniques for determining a canonical GUI from a GUI page.

In some implementations, the process of creating a canonical GUI page may include determining whether individual GUI elements (or parts of GUI elements, such as attributes or text) are likely to be constant across a group of pages or are likely to vary among pages in a group of pages. Any appropriate techniques may be used to determine whether individual GUI elements are likely to be constant or vary among a group of pages.

In some implementations, a surprise score may be computed for a GUI element that corresponds to whether we expect to see a GUI element given its parent GUI element across the usage data. Where the GUI element is expected, then the surprise score may be low, and where the GUI element is unexpected, then the surprise score may be high. For example, a surprise score may be computed as $-\log P(E_c|E_p)$ or the negative logarithm of the conditional probability of the occurrence of a GUI element ($E_c$) given the occurrence of its parent GUI element ($E_p$).

In some implementations, the surprise score for a GUI element may be computed by looking for the presence of the parent element across the usage data, and counting the number of times that the GUI element appears as a child of the parent element. For example, suppose that the parent element appears in the usage data 100 times and the child element appears as a child of the parent element 100 times. The surprise score may be computed as $-\log 100/100$ which equals 0 and corresponds to no surprise. By contrast, where the parent element appears in the usage data 100 times and the child element appears as a child of the parent element 1 time. The surprise score may be computed as $-\log 1/100$ which equals about 4.6 and corresponds to a higher surprise level.

In computing a surprise score, different levels of specificity may be used when searching for the parent element. In some implementations, the parent element may be specified according to some or all of the elements between the parent element and the root element of the GUI page, and these elements will be referred to as intervening elements. Further, the parent element may be further specified according to one or more attributes of the parent element, text of the parent element, attributes of intervening elements, and text of intervening elements.

FIG. 7 is a portion of an example web page, and this example will be used to provide example techniques for specifying GUI elements. In FIG. 7, the form element is the parent of two label elements and two input elements. In some implementations, the parent element may be specified using an XPath, which is known to one of skill in the art. The following are non-limiting example techniques for specifying the form element using an XPath:

| XPath | Description |
| --- | --- |
| /html/body/form | Only tags |
| /html[1]/body[1]/form[3] | Tags and index of child in parent (this assumes that there are two form elements prior to this one in the body) |
| /html/body/form[@class='address-form'] | Tags for intervening elements and attributes for parent element |
| /html/body/form[text( )='Email Address Form'] | Tags for intervening elements and text for parent element |
| /html/body/form[[@class='address-form' and text( )='Email Address Form'] | Tags for intervening elements and attributes and text for parent element |
| /html/body[@class='content']/form[@class='address-form'] | Attributes for all elements |
| /html/body[@class='content' and text( )='Body Text]/form[@class='address-form' and text( )='Email Address Form'] | Attributes and text for all elements |
| //body[@class='content' and text( )='Body Text]/form[@class='address-form' and text( )='Email Address Form'] | Attributes and text for parent element and grandparent element |

In some implementations, the text of GUI elements in the usage may have been processed to replace the text with a hash of the text. The usage data may include data from real GUIs (e.g., websites) and thus may contain personal information, such as personally identifiable information, or other sensitive information, such as credit card numbers and social security numbers. To reduce risks associated with processing personal information, the text of GUI elements may be processed with a cryptographic hash function to conceal or prevent disclosure of the sensitive information. The computed hash values may be used in place of the original GUI element text. In some implementations, all GUI element text may be processed or hashed regardless of whether the GUI element text actually contains personal or sensitive information. Any appropriate modification or hash function may be used, such as secure hash algorithms (SHA), digital signature algorithms (DSA), or salted hashes. In some implementations, other portions of a GUI element may also be hashed. For example, an attribute value of a GUI element may include personal or sensitive information, and the attribute values may also be hashed before being used to compute a graph model of a GUI. In any of the examples described herein, hashes or other privacy techniques may be used in place of GUI element text or any other text of GUI elements, such as attribute values.

Accordingly, to compute a surprise score for a first GUI element of a first GUI page, the following steps may be performed: determine a specification for the parent GUI element of the first GUI element in the first GUI page (e.g., any of the XPath variations described above); count the number of times this specification of the parent GUI element appears in the usage data; for each instance of the specified parent GUI element determine if the first GUI element is present as a child element; count the number of times the first GUI element is present as a child element of the specified GUI element; and compute the surprise score as described above.

When determining whether the first GUI element is a child element of an instance of the specified parent GUI element, either an exact match may be performed or a partial match. For example, it may be sufficient if a child GUI element with the same tag and text is present or it may be required that other parameters (e.g., attributes or index) of the child GUI element match the first GUI element.

Accordingly, a surprise score may be computed for some or all of the GUI elements in the usage data. GUI elements may then be categorized as static elements or dynamic elements using the surprise score. For example, elements with a surprise score greater than a threshold may be categorized as dynamic elements, and elements with a surprise score below a threshold may be categorized as static elements. In some cases, the thresholds may be determined based on known training data. In some cases, the thresholds may be set by a user based on experience and may be periodically or systematically verified based on manual or automated spot checks of the categorized elements.

A canonical GUI page may be created from a GUI page by modifying elements of the GUI page that are categorized as dynamic elements. For example, a canonical GUI page may be created by removing all dynamic elements from the GUI page (including text and child elements of dynamic elements) or replacing dynamic elements with an indicator such as a wildcard character.

Accordingly, a canonical GUI page may be created for each GUI page of the usage data. A result of removing or modifying dynamic elements of GUI pages may be that multiple GUI pages may have the same canonical GUI page. For example, referring to FIG. 2B, the usage data may have many address updated pages where the address information is different on different pages. The GUI elements corresponding to the address information may be classified as dynamic elements, and the canonical GUI pages of all the address updated pages may be the same as each other.

In some implementations, surprise scores may be computed for different portions of a GUI element instead of an entire GUI element. For example, a surprise score may be computed for one or more of the tag, attributes, and text of the GUI element. Accordingly, when creating a canonical GUI page from a GUI page, portions of dynamic elements may be modified instead of modifying the entire GUI element. For example, an attribute value or text of the GUI element may be modified leaving the remaining portions of the GUI element unchanged. Any of the techniques described above may be used to determine surprise scores for portions of GUI elements and modifying portions of GUI elements to generate canonical GUI pages.

A graph node may be created for each distinct canonical page, and accordingly the nodes may be used to create a graph model for the GUI. A graph node may be associated with a canonical GUI page to determine whether other GUI pages are a match to the node. For example, a first GUI page with a first canonical GUI page may be considered a match to the node if the first canonical GUI page is equal to the canonical GUI page of the node.

The actions in the usage data may be used to generate graph edges for the graph model. An action may be specified using one or more of an initial GUI page on which the action was performed, a GUI element on the initial page that acted upon, a type of action that was performed (e.g., a mouse click or a key press), and a resulting GUI page after the performance of the action. The traces of the usage data may include information needed to specify the actions, and this information may be extracted from the traces for further processing.

A graph edge may be determined from an action by replacing the initial and/or resulting GUI pages of the action with corresponding graph nodes (or their corresponding canonical GUI pages). Different actions may result in the same graph edge if the initial and resulting GUI pages map to the same graph nodes, the actions correspond to the same GUI element being acted upon, and the type of action is the same. In some implementations, these conditions may be relaxed and two actions may correspond to the same edge (the initial and resulting GUI pages map to the same graph nodes).

In some implementations, a probabilistic transition system may be used with the graph model. A probabilistic transition system includes (i) a set of nodes, such as the nodes described above, (ii) a set of edges, such as the edges described above, and (iii) a probability of an edge being traversed given the initial node and the action corresponding to the edge being performed.

In some implementations, given an initial node and an action performed from the initial node, the resulting node may not be deterministic. For example, when filling out a form, submission of the form may result in a confirmation page if the form was filled out correctly and may result in an error page if the form was not filled out correctly. For another example, the result of performing an action may typically produce an expected resulting page, but a network error or an error result from an API call may cause an error page to be presented.

Any appropriate techniques may be used to compute the probabilities for the probabilistic transition system. For example, to compute the probability of transitioning from a first node to a second node after performing a first action, the following counts may be determined: (i) the number of times in the usage data that the first action was performed from a GUI page corresponding to the first node and (ii) a number of times that performing the first action from a GUI page corresponding to the first node resulted in a GUI page corresponding to the second node. The probability may then be determined as a sample probability by dividing the two counts.

Figure 8:
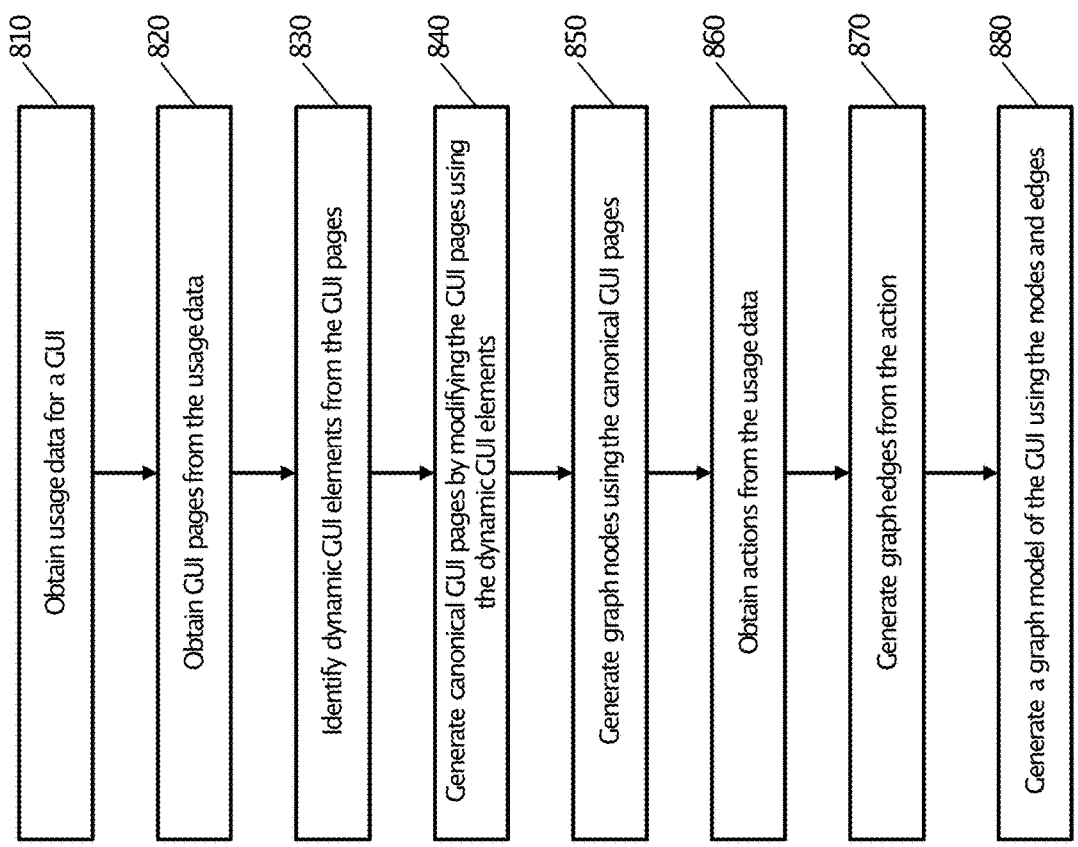
FIG. 8 is a flowchart of an example method for generating a graph model of a GUI.

FIG. 8 is a flowchart of an example method for generating a graph model of a GUI.

At step 810, usage data of a GUI is obtained. The usage data may be obtained using any appropriate techniques. In some implementations, software may be installed on one or more user devices (e.g., a web browser extension) to obtain the usage data as users navigate the GUI. In some implementations, usage data may be obtained using techniques to automate navigation of a GUI. For example, a headless browser may be used to request GUI pages, and software may be used to implement a desired navigation strategy (e.g., random navigation, depth-first navigation, or breadth-first navigation). The usage data may be stored in any appropriate format. In some implementations, the usage data may include traces where each trace includes a sequence of GUI pages and actions that were performed to navigate from a starting GUI page to a resulting GUI page.

At step 820, GUI pages are obtained from the usage data. The GUI pages may be represented using any appropriate techniques, such as the HTML or other instructions used to generate the GUI page. In some implementations, all GUI pages may be used or a subset of the GUI pages may be used. Obtaining GUI pages from usage data may involve one or more filtering operations (e.g., to remove user actions from the data), pattern matching (e.g., identification of HTML tags), and the like. In some cases the usage data may include different identifiers, files, folders, and the like for categorizing different types of data and obtaining GUI pages from the usage data may include extracting data from the appropriate file or folder. In some cases, obtaining GUI pages from the usage data may include one or more data transformations and verification steps such as converting to or from a DOM representation.

At step 830, dynamic GUI elements are identified from the GUI pages. A dynamic GUI element may include any GUI element that is likely to vary among a group of GUI pages that are otherwise similar to each other. Any appropriate techniques may be used to identify dynamic GUI elements. For example, a dynamic GUI element may be identified by computing a surprise score (such as by using any of the techniques described herein) for the GUI element and comparing the surprise score to a threshold. In some cases, a dynamic GUI element may be identified if the surprise score for the element is greater than or equal to a threshold. In some cases, a static GUI element may be identified if the surprise score for the element is less than a threshold. In some cases, dynamic GUI elements may be identified by a search or comparison of known dynamic elements, comparison of known dynamic element features, code elements, and the like.

At step 840, canonical GUI pages are generated by modifying the GUI pages using the dynamic GUI elements. Any appropriate techniques may be used to generate the canonical GUI pages. In some implementations, the canonical GUI pages may be created by removing or modifying dynamic GUI elements or portions of dynamic GUI elements. For example, a dynamic GUI element or a portion of a dynamic GUI element may be removed or replaced by a wildcard character.

At step 850, graph nodes are generated using the canonical GUI pages. Because dynamic information is removed when generating canonical GUI pages, two different GUI pages may have the same canonical GUI page. In some implementations, a node may be created for each unique canonical GUI page, and the node may be associated with the corresponding canonical GUI page (e.g., to determine which GUI pages correspond to the canonical GUI page and thus also correspond to the node). In some implementations, one or more canonical GUI pages may be associated with a node. For example, the canonical GUI pages may be clustered (e.g., using GUI page embeddings of the canonical GUI pages) and canonical GUI pages that are sufficiently close to each other may be assigned to the same node.

At step 860, actions are obtained from the usage data. The action may be represented using any appropriate techniques. For example, an action may be represented as an identifier of the starting GUI page before the action was performed, a GUI element that was acted upon, the type of action that was performed (e.g., mouse click or double click), and an indicator of a resulting GUI page. In some implementations, all actions may be used or a subset of the actions may be used.

At step 870, graph edges are generated using the actions. In some implementations, the starting and resulting GUI pages of the action may be mapped to canonical GUI pages or graph nodes. An edge may then be created for each unique combination of starting graph node, GUI element acted upon, the type of action that was performed, and the resulting graph node. In some implementations, edges may be created based on more or less information. For example, an edge may be created for each unique combination of starting graph node and resulting graph node.

At step 880, a graph model of the GUI is generated using the graph nodes and the graph edges. Any appropriate techniques may be used to generate the graph model. For example, computer software, such as the Python NetworkX library, may be used to create a representation of the graph model that may be used for various applications, such as any of the applications described herein Predictive Models of Graphical User Interfaces A mathematical model for a GUI may also be a predictive model. A predictive mathematical model may process information about a GUI page to predict a result, such as a likely subsequent page in the GUI, a likely action to be performed on the page, or a best matching node of the graphs described above.

A predictive model may include a neural network. For example, a neural network may process a representation of a GUI (and optionally other information) and output a result, such as a representation of a likely subsequent GUI page or classification scores or probabilities.

A predictive model may process any appropriate representation of GUI pages and/or GUI elements. In some implementations, a predictive model may process a vector of numbers that represents a GUI page and/or GUI element. Any appropriate vectors may be used such as a GUI page encoding or a GUI element embedding as described in the applications incorporated by reference.

A GUI element embedding is a vector in a vector space that represents a GUI element. The GUI element embedding may have similar properties to word embeddings and may be used for applications of GUI pages. For example, the similarity of two GUI elements may be determined by computing a distance between the GUI element embeddings of the two GUI elements. A GUI element embedding may be computed using any appropriate techniques, such as any of the techniques described in the incorporated applications.

A GUI page encoding is a vector in a vector space that represents a GUI page. The GUI page encoding may have similar properties to sentence encodings and may be used for applications of GUI pages. For example, the similarity of two GUI pages may be determined by computing a distance between the GUI page encodings of the two GUI pages. A GUI page encoding may be computed for a GUI page using any appropriate techniques, such as any of the techniques described in the incorporated applications. For example, a GUI page encoded may be computed by processing a GUI page with a GUI page encoding GUI page encoding model, such as a neural network.

FIG. 9 is an example system for training a predictive model for a GUI using a corpus of training data and using model training component 910. A predictive model may be trained using any appropriate training techniques. In some implementations, a predictive model may be trained using supervised training procedures and a corpus of labelled training data. A training corpus may include a large number of training samples, where each training sample includes an input to the predictive model and a desired prediction result. By performing a supervised training process, the prediction model is able to learn to accurately compute prediction results by iteratively processing the training data using techniques such as stochastic gradient descent.

Example predictive models are now described.

FIG. 10A is an example system for implementing a predictive model for predicting a subsequent GUI page, which is indicated as GUI transition model 1010. GUI transition model 1010 may be trained using any appropriate techniques, such as any of the techniques described herein. GUI transition model 1010 may receive as input a representation of a GUI page (such as a GUI page encoding) and predict a representation of a subsequent GUI page (such as a GUI page encoding). In some implementations, GUI transition model 1010 may also receive as input information about an action performed on the input GUI page, such as a representation of a GUI element acted upon (e.g., a GUI element embedding) and/or a type of action performed (e.g., mouse click or key press). GUI transition model 1010 may be trained with a training corpus of traces of usage of the GUI, such as the traces described above.

FIG. 10B is an example system for implementing a predictive model for predicting a best matching graph node, which is indicated as node selection model 1020. Node selection model 1020 may be trained using any appropriate techniques, such as any of the techniques described herein. Node selection model 1020 may receive as input a representation of a GUI page (such as a GUI page encoding) and output probabilities or scores corresponding to one or more graph nodes. For example, a graph node with a highest probability or score may be selected. Node selection model 1020 may be trained from a labelled training corpus of GUI pages where each GUI page is labelled with a node of the graph.

Predictive models may be used with graph models to provide a more accurate model of a GUI. The following are example situations where a predictive model may improve a graph model: (i) the GUI is modified such that one or more GUI pages no longer match nodes that they previously matched (e.g., their canonical GUI pages no longer match any nodes); (ii) the GUI contains one or more pages that are not present in the usage data of the GUI and thus the graph model may not have nodes that correspond to the unseen GUI pages; (iii) the GUI pages include possible actions that were not performed in the usage data and thus the graph model may not have edges that correspond to the unseen actions; or (iv) the GUI page resulting from an action may not match the expected GUI page (e.g., if an error occurs that was not seen in the training data). These examples will be discussed in greater detail below.

A graph model of a GUI may be used to process usage data of users using the GUI. To distinguish this usage data from the usage data that was used to generate the graph model, the usage data that was used to generate the graph model is referred to as training data and the usage data that is processed by an existing graph model is referred to as processing data. The training data and the processing data may be the same, may partially overlap, or may be completely different from each other. The training data and processing data are collectively referred to as usage data. When describing generating a graph model using usage data and then processing usage data with a graph model, it is understood that the usage data for training and for processing may be the same, may be different, or may partially overlap.

In processing the usage data, it may be desired to match a GUI page from the usage data to a node of the graph model. Where the GUI has been modified since the graph model was created, some GUI pages may no longer map to nodes of the graph model (the canonical page of a GUI page in the usage data may not match any of the nodes). In some instances, the changes in the GUI may be cosmetic (e.g., changing colors and layout), and in some instances, the changes may be more significant (e.g., removing part of the functionality of a GUI page).

One solution may be to recreate a new graph model using a new set of training data from the updated GUI, but it may take a significant amount of time to collect a sufficient amount of new training data and to generate a new graph model. Another solution may be to map GUI pages to the closest node in the graph. In some implementations, GUI page encodings may be used to map a GUI page to the closest graph node.

In some implementations, node selection model 1020 may be used to predict a graph node corresponding to the GUI page. Node selection model 1020 may process a representation of the GUI page (e.g., a GUI page encoding) and compute a vector of scores where elements of the vector correspond to nodes of the graph. In some implementations, a node with a highest score may be determined to be the closest node. Where the highest score is sufficiently large (e.g., greater than a threshold), the GUI page may be mapped to the closest node.

In some implementations, node encodings of nodes of the graph may be used to determine a graph node corresponding to the GUI page. A node encoding may be computed using any appropriate techniques. For example, a node encoding may be computed by processing the canonical GUI page corresponding to the node with the GUI page encoding model. For another example, a node encoding may be computed as the average of the GUI page encodings of all GUI pages in the training data that map to the node.

To find a closest node to a GUI page, the GUI page encoding of the GUI page may be compared to the node encodings of the nodes. For example, the closest node may be determined by computing a distance or inner product between the GUI page encoding and the node encodings. Where the distance to the closest node is sufficiently small (e.g., less than a threshold), the GUI page may be mapped to the closest node.

Where the closest node is sufficiently close to the GUI page encoding, the graph model may then be used as if the GUI page actually matched the corresponding node.

Where the distance between the GUI page and the closest node is not sufficiently small, it may be determined that the GUI page does not match any of the nodes. In this scenario, it may be determined that the GUI page was not seen in the training data. In some implementations, a new node may be added to the graph for the unseen GUI page, and an edge may be added corresponding to the action that was performed to arrive at the unseen GUI page (and if a subsequent action was performed from the previously unseen GUI page then another edge may be added to connect to the subsequent page).

In some situations, the usage data may include actions that were not performed in the training data. For example, a GUI page may have a button or other control that was not acted upon in the training data. Where the usage data includes an action that was not present in the training data and thus not represented in the graph model, a new edge may be added to the graph model corresponding to the action.

In some implementations, it may be desired to process GUI pages from the training corpus to identify possible unseen actions (e.g., buttons that were never clicked) and to determine a likely result of performing the action. GUI transition model 1010 may be used to process a GUI page and/or action that may be performed on the GUI page to predict a subsequent GUI page. For example, GUI transition model 1010 may predict a GUI page encoding of a likely subsequent page. Where the predicted GUI page is sufficiently close to a GUI page that was seen in the training data or sufficiently close to an existing node of the graph model (e.g., by comparing node encodings), then an edge may be added to the graph model, between the GUI page and the predicted subsequent GUI page. Where the predicted GUI page is not sufficiently close to a GUI page in the training corpus or an existing node of the graph, then a new node may be added to the graph model corresponding to an unknown or unseen page.

In some situations, the GUI page resulting from an action in the usage data may not match the expected resulting GUI page in the graph model. For example, performing a first action on a first GUI page on the graph model (corresponding to a first node) may result in a second node of the graph model. In the usage data, performing the first action on the first GUI page may result in a GUI page that corresponds to a third node of the graph model (or an unseen GUI page as described above). Where this occurs, a new edge may be added to the graph model between the first node and the third node.

Applications of GUI Models

A GUI model may include a graph model, a predictive model, or a combination of the two. A GUI model may be used in a variety of applications to improve the performance of a GUI or to improve the performance of people using the GUI (e.g., customer service agents).

In some implementations, usage data of the GUI may be processed with a GUI model to determine usage statistics of the GUI. The nodes and/or edges of the GUI graph model may then be augmented with usage statistics. Usage statistics may include one or more of the following: a number of times a node was accessed; statistics relating to an amount of time spent at a node (e.g., between arriving at the node and then performing an action to arrive at a different node) such as an average time, median time, or a histogram of times; a number of times an edge was traversed; statistics relating to an amount of time to traverse an edge (e.g., between arriving at the node containing a control to perform an action corresponding to the edge and then performing the action) such as an average time, median time, or a histogram of times; a number of unique users accessing a node or performing an action corresponding to an edge; a number of keystrokes performed at a node; or the times of day or days of the week corresponding to nodes or edges.

Any appropriate techniques may be used to determine the usage statistics using the GUI model and the usage data. For example, nodes and/or edges may be associated with variables corresponding to the statistics, and the usage data may be processed using graph traversal techniques and algorithms known to one of skill in the art. The usage statistics of the GUI may provide valuable information to the company providing the GUI to allow the company to improve the operation of the GUI.

In some implementations, the company may determine nodes and/or edges of the graph that correspond to the largest total amount of time spent by users of the GUI. The company may then review the GUI pages corresponding to these nodes to determine improvements to the GUI pages and/or the actions corresponding to the edges to allow users to navigate the GUI more efficiently. For example, the top 10 GUI pages and/or edges may be reviewed. For another example, all GUI pages and/or edges where the total time spent exceeds a threshold may be reviewed. By focusing GUI improvement efforts on GUI pages and/edges consuming the most time of users, the company may cost effectively improve the overall performance of the GUI for all users. For example, for a GUI page takes a relatively modest amount of time (e.g., 10 seconds) but is used frequently (e.g., one of the most commonly accessed GUI pages), then reducing the average time spent on that page by 1-2 seconds may provide a large overall benefit.

In some implementations, the company may determine the nodes and/or edge of the graph that corresponds to the largest median (or average) amount of time spent by users of the GUI. While the GUI nodes and/or edges corresponding to the largest median time may be a relatively small part of the total time spent on the GUI (e.g. if the nodes and/or edges are not frequently accessed), these nodes and/or edges may provide a bad user experience that should be improved. For example, for a GUI page and/or edge that typically takes 30 minutes, reducing the typical time to 5 minutes would provide a large benefit to users needing that functionality. Such improvements may also reduce support requests from users who are not willing to spend that much time on the GUI.

Similar usage statistics may be collected for individual users of the GUI. For example, any of the statistics described herein may be collected for individual users. In some implementations, usage statistics may be collected for customer service agents providing support to customers of a company.

In some implementations, the usage statistics of a first user may be reviewed to determine nodes and/or edges that take significantly longer than the median or average user. It may then be suggested or required that the first user undergo training to improve the performance of the first user for that portion of the GUI.

In some implementations, usage statistics of individual users may be used as part of a performance analysis of the users. For example, users who navigate the GUI more efficiently may be recognized for their skills, receive a pay increase or bonus, or be promoted. Users who navigate the GUI less efficiently may undergo additional training, be placed on probation, or dismissed from their employment.

In some implementations, it may be desired to determine information about common tasks that are performed using the GUI. Users of a GUI may perform tasks in the GUI that may require a sequence of steps that may correspond to more than node and/or edge. In some instances, the steps may be performed in different orders. For example, a task may be updating an address that includes steps of updating the street, city, state, and zip code, and the user may update the individual items in any order.

In some implementations, relevant tasks may be identified by identifying subgraphs of the graph model that are used frequently or require significant time for users. Any appropriate techniques may be used to identify relevant subgraphs of a graph model.

In some implementations, subgraphs of a graph model may be determined by removing relatively infrequently used edges of the graph, such as edges where the count of the number of times the edge was used is less than a threshold. After removing infrequent edges, a single graph may be split into multiple subgraphs. In some implementations, infrequent edges may be added back to a subgraph where the beginning and ending nodes of the infrequent edges are both within the subgraph. By adding infrequent edges back to a subgraph, a more complete understanding of the subgraph may be obtained.

In some implementations, a node of a subgraph may be designated as a start node and another node of the subgraph may be designated as an end node. For example, the node with the fewest number of inbound edges may be determined as the start node, and the node with the fewest number of outbound edges may be determined as the end node. In some implementations, a subgraph may have more than one start or end node. A subgraph may be associated with the performance of a task, such as an address update task. The task corresponding to a subgraph may be determined by a person (e.g., via manual review) or by obtaining information (e.g., page titles) from GUI pages corresponding to the subgraph.

Figure 11:
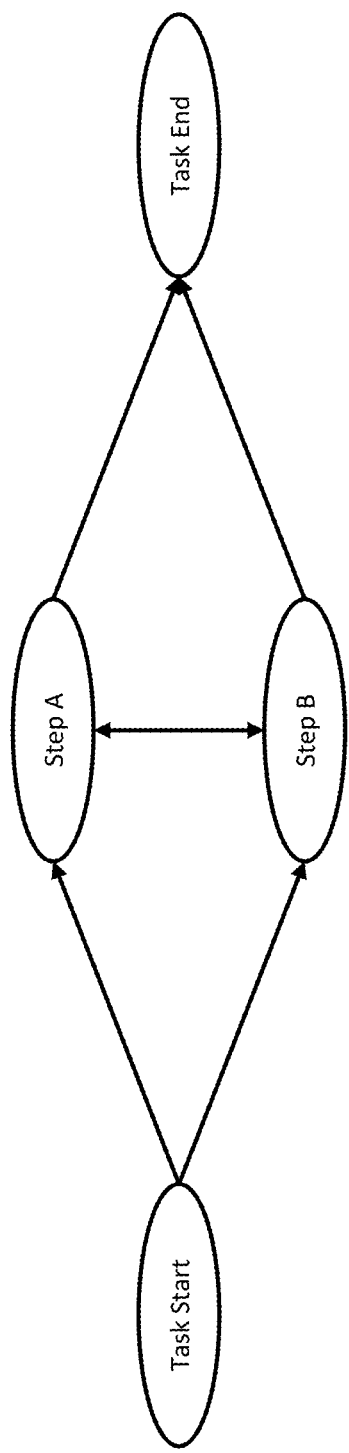
FIG. 11 is an example subgraph that may be obtained from a graph model.

FIG. 11 is an example subgraph that may be obtained from a graph model. In this example, the subgraph has a task start node, a task end node, a node for a first step and a node for a second step, where the steps may be performed in either order. For example, FIG. 11 may correspond to a task of updating two pieces of information, such as a user name and a password.

Usage statistics may be collected for subgraphs of a graph model, such as any of the statistics described herein. A company operating the GUI may then use the statistics of subgraphs to perform any of the actions described herein. For example, the company may review subgraphs taking the longest total amount of time, subgraphs taking the longest median or average amount of time, or statistics of subgraphs for individual users of the GUI.

Figure 12:
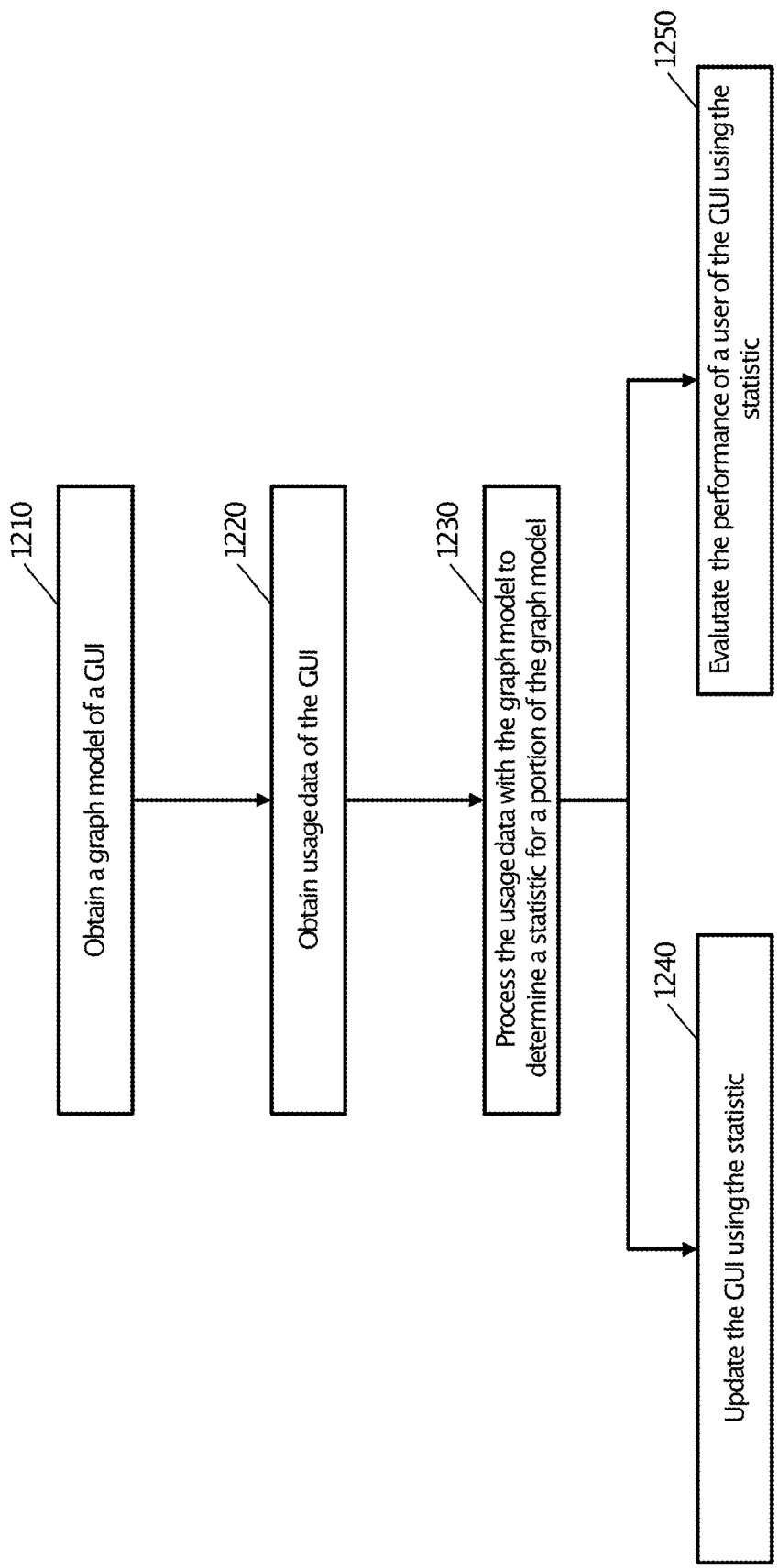
FIG. 12 is a flowchart of an example method for processing usage data of a GUI with a graph model to determine a statistic.

FIG. 12 is a flowchart of an example method for processing usage data of a GUI with a graph model to determine a statistic.

At step 1210, a graph model of a GUI is obtained. Any appropriate techniques may be used to obtain a graph model of a GUI, such as any of the techniques described herein. In some implementations a predictive model of a GUI may also be obtained and used with the graph model.

At step 1220, usage data of the GUI is obtained. Any appropriate techniques may be used to obtain the usage data, such as any of the techniques described herein, such as at step 810 of FIG. 8.

At step 1230, the usage data is processed with the graph model to determine a statistic for a portion of the graph model. Any appropriate techniques may be used to compute the statistic, such as any of the techniques described herein. The portion of the graph model may correspond to any combination of one or more nodes, one or more edges, or one or more subgraphs. In some implementations, the usage data may also be processed with a predictive model, such as any of the predictive models described herein, to perform any of the operations described herein.

Following step 1230, either or both of step 1240 and step 1250 may be performed.

At step 1240, the GUI may be updated using the statistic. Any appropriate updates to the GUI may be performed using any appropriate techniques. For example, updates may include any combination of the following: combining GUI pages; splitting a GUI page into two or more pages; removing or adding actions to GUI pages; modifying the layout of GUI pages; moving content from one GUI page to another GUI page; or improving backend processing that generates GUI pages or obtains information needed to generate GUI pages.

At step 1250, the performance of a user of the GUI may be evaluated using the statistic. Any appropriate evaluation may be performed. For example, the user of the GUI may be a customer service agent, and the user may be rewarded for good performance or penalized for poor performance.

It can be seen that the implementations set forth throughout the present disclosure provide technical improvements for rapid and reliable analysis, of GUI elements such as a page, site, application, or the like. The development of a graph model of a GUI, and/or the processing of usage data of the GUI, facilitate numerous technical improvements over previously known systems and operations. Without limitation to any other aspect of the present disclosure, implementations set forth herein provide for: systematic analysis of GUI usage statistics (e.g., which GUI elements or actions are frequent or time consuming), prediction of GUI elements or sequences (e.g., the likelihood of an action or transition to a different page), data driven GUI improvement suggestions (e.g., which elements can be eliminated or made larger), systematic analysis and determination of static and dynamic elements, and the like. It can be seen that the implementations set forth throughout the present disclosure additionally provide for, where desired, privacy functions which allow processing and analysis of data without direct manipulation of private or sensitive data.

Implementation

Figure 13:
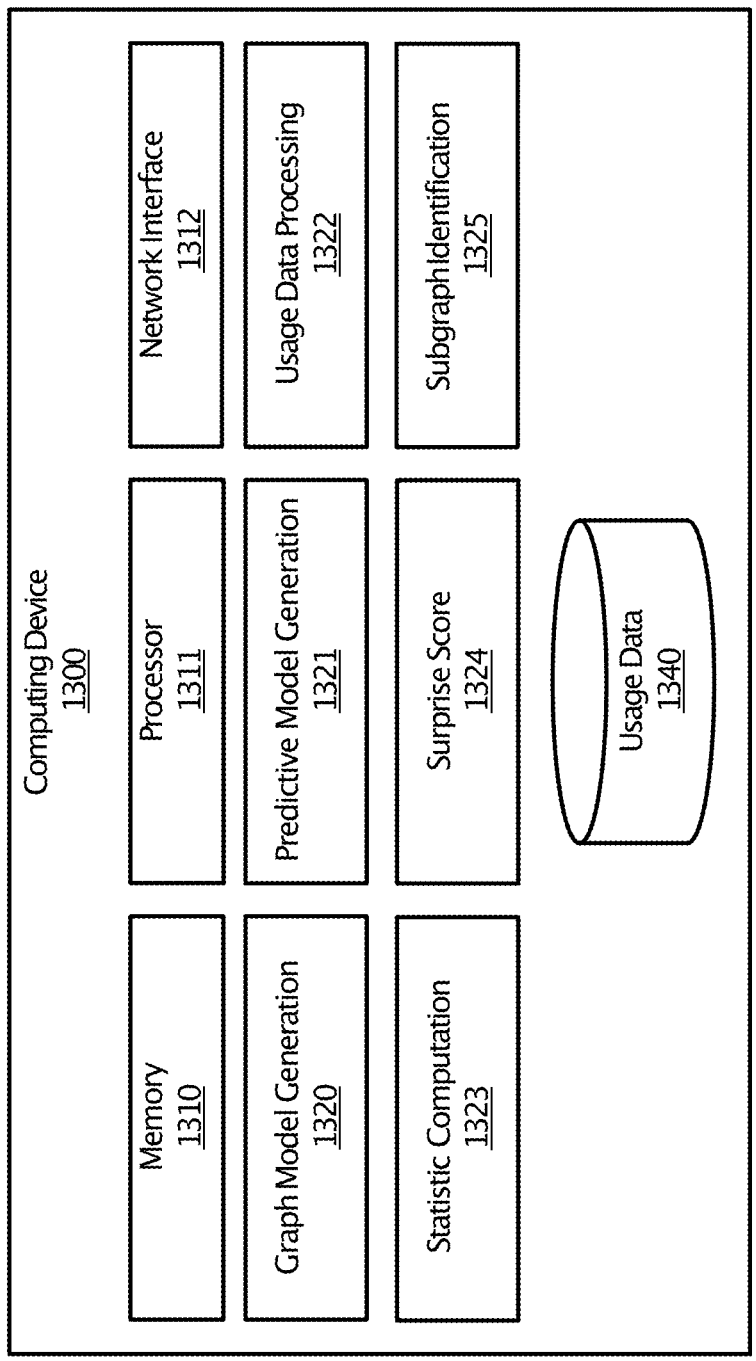
FIG. 13 illustrates components of an exemplary computing device for generating a model of a GUI or processing usage data of a GUI.

FIG. 13 illustrates components of one implementation of a computing device 1300 for implementing any of the techniques described above. In FIG. 13, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1300 may include any components typical of a computing device, such as volatile or nonvolatile memory 1310, one or more processors 1311, and one or more network interfaces 1312. Computing device 1300 may also include any input and output components, such as displays, keyboards, and touch screens. Computing device 1300 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1300 may have a graph model generation component 1320 that may process usage data to generate a graph model of a GUI using any of the techniques described herein. Computing device 1300 may have a predictive model generation component 1321 that processes training data to generate a predictive model of a GUI using any of the techniques described herein. Computing device 1300 may have a usage data processing component 1322 that may process usage data of a GUI with a GUI model (e.g., one or both of a graph model and a predictive model) using any of the techniques described herein. Computing device 1300 may have a statistic computation component 1323 that may compute a statistic relating to a GUI using a GUI model and using any of the techniques described herein. Computing device 1300 may have a surprise score computation component 1324 that may compute a surprise score for a GUI element using any of the techniques described herein. Computing device 1300 may have a subgraph identification component 1325 that may identify relevant subgraphs of a graph model of a GUI using any of the techniques described herein.

Computing device 1300 may include or have access to various data stores. Data stores may use any known storage technology such as files, relational databases, non-relational databases, or any non-transitory computer-readable media. Computing device 1300 may have a usage data store 1340 that may store usage data of a GUI that may be used to generate a GUI model or may be processed by a GUI model.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
    obtaining usage data of a graphical user interface (GUI) comprising sequences of GUI pages; and
    generating a graph model of the GUI, wherein generating the graph model comprises:
        obtaining a plurality of GUI pages from the usage data,
        identifying a plurality of dynamic GUI elements from the plurality of GUI pages,
        generating a plurality of canonical GUI pages by modifying the plurality of GUI pages using the plurality of dynamic GUI elements, and
        generating a plurality of graph nodes using the plurality of canonical GUI pages.

2. The computer-implemented method of claim 1, wherein:
    the usage data comprises actions between GUI pages; and
    generating the graph model comprises:
        obtaining a plurality of actions from the usage data, and
        generating a plurality of graph edges using the plurality of actions.

3. The computer-implemented method of claim 1, wherein the GUI corresponds to a website and the GUI pages are HTML pages.

4. The computer-implemented method of claim 1, comprising:
    generating a predictive model of the GUI; and
    processing a GUI page with the predictive model to select a graph node from the plurality of graph nodes.

5. The computer-implemented method of claim 4, wherein the predictive model comprises a neural network.

6. The computer-implemented method of claim 4, wherein the predictive model is trained by processing the usage data of the GUI.

7. The computer-implemented method of claim 1, comprising processing second usage data with the graph model to determine a statistic for a portion of the graph model.

8. The computer-implemented method of claim 7, wherein the portion of the graph model comprises an edge, a node, or a subgraph.

9. A system, comprising:
    at least one server computer comprising at least one processor and at least one memory, the at least one server computer configured to:
        obtain usage data of a graphical user interface (GUI) comprising sequences of GUI pages; and
        generate a graph model of the GUI, wherein generating the graph model comprises:
            obtaining a plurality of GUI pages from the usage data,
            identifying a plurality of dynamic GUI elements from the plurality of GUI pages, generating a plurality of canonical GUI pages by modifying the plurality of GUI pages using the plurality of dynamic GUI elements, and generating a plurality of graph nodes using the plurality of canonical GUI pages.

10. The system of claim 9, wherein:

the usage data comprises actions between GUI pages; and the at least one server computer is configured to generate the graph model by:

obtaining a plurality of actions from the usage data, and generating a plurality of graph edges using the plurality of actions.

11. The system of claim 9, wherein the at least one server computer is configured to process second usage data with the graph model to determine a statistic for a portion of the graph model.

12. The system of claim 11, wherein the statistic is a total amount of time, a median amount of time, or an average amount of time.

13. The system of claim 9, wherein identifying the plurality of dynamic GUI elements comprises computing a conditional probability of a GUI element given its parent GUI element.

14. The system of claim 9, wherein generating the plurality of canonical GUI pages comprises modifying or removing the plurality of dynamic GUI elements.

15. The system of claim 9, generating the plurality of canonical GUI pages comprises replacing a dynamic GUI element or a portion of a dynamic GUI element with a wildcard indicating dynamic information.

16. One or more non-transitory, computer-readable media comprising computer-executable instructions that, when executed, cause at least one processor to perform operations comprising:

obtaining usage data of a graphical user interface (GUI) comprising sequences of GUI pages; and generating a graph model of the GUI, wherein generating the graph model comprises:

obtaining a plurality of GUI pages from the usage data, identifying a plurality of dynamic GUI elements from the plurality of GUI pages, generating a plurality of canonical GUI pages by modifying the plurality of GUI pages using the plurality of dynamic GUI elements, and generating a plurality of graph nodes using the plurality of canonical GUI pages.

17. The one or more non-transitory, computer-readable media of claim 16, wherein:

the usage data comprises actions between GUI pages; and generating the graph model comprises:

obtaining a plurality of actions from the usage data, and generating a plurality of graph edges using the plurality of actions.

18. The one or more non-transitory, computer-readable media of claim 17, wherein a graph edge is associated with a probability.

19. The one or more non-transitory, computer-readable media of claim 16, wherein the operations comprise:

generating a predictive model of the GUI; and processing a GUI page with the predictive model to select a graph node from the plurality of graph nodes.

20. The one or more non-transitory, computer-readable media of claim 16, wherein identifying the plurality of dynamic GUI elements comprises computing a conditional probability of a GUI element given its parent GUI element.

* * * * *